US008749494B1

United States Patent
Delker et al.

(10) Patent No.: US 8,749,494 B1
(45) Date of Patent: Jun. 10, 2014

(54) TOUCH SCREEN OFFSET POINTER

(75) Inventors: Jason R. Delker, Olathe, KS (US); John M. Everson, Leawood, KS (US); Michael T. Lundy, Olathe, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 953 days.

(21) Appl. No.: 12/145,465

(22) Filed: Jun. 24, 2008

(51) Int. Cl.
*G06F 3/041* (2006.01)

(52) U.S. Cl.
USPC .................................................. 345/173

(58) Field of Classification Search
USPC .................................................. 345/173
See application file for complete search history.

(56) References Cited

U.S. PATENT DOCUMENTS

| | | | |
|---|---|---|---|
| 4,460,974 A | 7/1984 | Jones | |
| 4,935,728 A | 6/1990 | Kley | |
| 5,041,819 A | 8/1991 | Takeda | |
| 5,596,347 A | 1/1997 | Robertson et al. | |
| 5,675,361 A | 10/1997 | Santilli | |
| 5,838,973 A | 11/1998 | Carpenter-Smith et al. | |
| 6,727,829 B2 | 4/2004 | Jam | |
| 6,727,892 B1 * | 4/2004 | Murphy | 345/173 |
| 7,091,954 B2 | 8/2006 | Iesaka | |
| 2003/0189597 A1 | 10/2003 | Anderson et al. | |
| 2006/0033701 A1 * | 2/2006 | Wilson | 345/156 |
| 2006/0244735 A1 * | 11/2006 | Wilson | 345/173 |
| 2007/0120828 A1 | 5/2007 | Fyke | |
| 2007/0247435 A1 * | 10/2007 | Benko et al. | 345/173 |
| 2008/0001924 A1 * | 1/2008 | de los Reyes et al. | 345/173 |

OTHER PUBLICATIONS

Delker, Jason R., et al., Patent Application entitled "Keyboard Emulation of Touch Surface," filed Jun. 16, 2008, U.S. Appl. No. 12/139,975.
Office Action dated May 25, 2011, U.S. Appl. No. 12/139,975, filed Jun. 16, 2008.
Final Office Action dated Sep. 14, 2011, U.S. Appl. No. 12/139,975, filed Jun. 16, 2008.
"Motorola Plans Finger-Writing Phone," http://www.phonescoop.com/news/item.php?n=974, Oct. 12, 2004, Phone Scoop.

* cited by examiner

*Primary Examiner* — Jonathan Boyd

(57) ABSTRACT

A device with a touch screen offset pointer is provided. The device includes a processor; a touch screen, and a navigator engine. When executed by the processor, the navigator engine detects a first touch input at a first location on the touch screen, determines a first offset for a pointer to overlay on content displayed by the touch screen, and displays the pointer on the touch screen at the first offset from the first location. The navigator engine also detects a second touch input at a second location on the touch screen, determines a second offset for the pointer, and displays the pointer on the touch screen at the second offset from the second location.

19 Claims, 8 Drawing Sheets

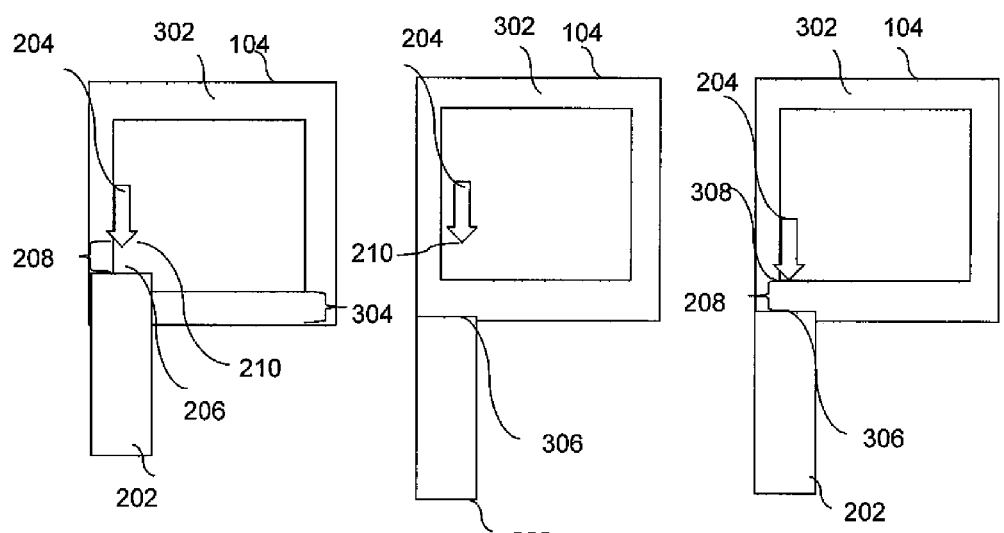

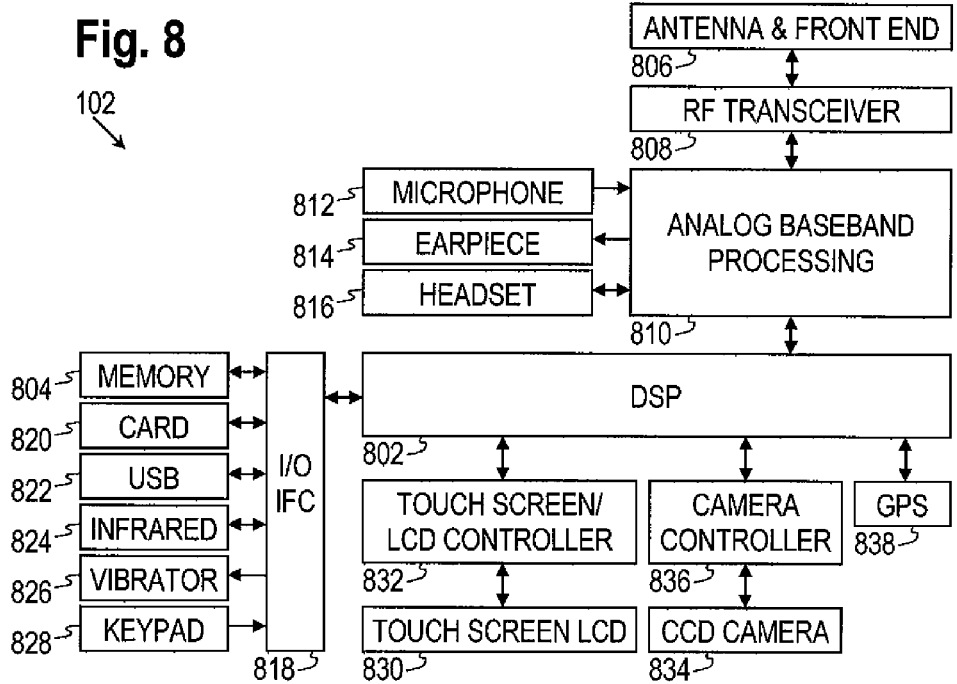
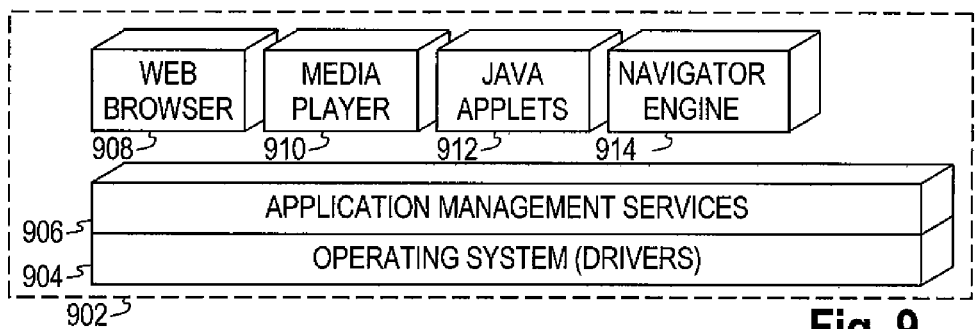

TOUCH SCREEN OFFSET POINTER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A computer or electronics device user may use a touch screen to traverse through content and pages displayed by an interface screen to locate specific content or information, and/or to select control inputs. A touch screen is a display which can detect the location of touches within the display area that partially block at least a portion of the display visually while displaying content in the rest of the display area. A touch screen allows the display to be used as an input device, removing the keyboard and/or the mouse as the primary input device for interacting with the display's content. However, the user may be dissatisfied with the functioning of the touch screen for their computer or electronics device, particularly when using mobile devices that have smaller interface screens, such as mobile phones and personal digital assistants.

SUMMARY

Accordingly, there is provided herein systems and methods for a device with a touch screen offset pointer. The device includes a processor, a touch screen, and a navigator engine. When executed by the processor, the navigator engine detects a first touch input at a first location on the touch screen, determines a first offset for a pointer to overlay on content displayed by the touch screen, and displays the pointer on the touch screen at the first offset from the first location. The navigator engine also detects a second touch input at a second location on the touch screen, determines a second offset for the pointer, and displays the pointer on the touch screen at the second offset from the second location.

In some embodiments, a first touch input is detected at a first location on a touch screen. The touch screen displaying a pointer that is offset from the first location is promoted. A second touch input is detected at a second location on the touch screen. A second offset is determined for the pointer. The pointer is displayed on the touch screen at the second offset from the second location is promoted.

Some devices with a touch screen offset pointer include a processor, a touch screen comprising a selectable content area, a border, wherein the border is without selectable content, and a navigator engine. When executed by the processor, the navigator engine detects a touch input at a location on the touch screen and determines an offset for a pointer to overlay on selectable content displayed by the touch screen. The navigator engine also promotes the touch screen displaying the pointer at the offset from the location, and promotes the touch screen displaying the pointer about the selectable content area when the touch input corresponds to the border.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3A illustrates another exemplary user interaction with an interface for a touch screen offset pointer according to some embodiments of the disclosure.

FIG. 3B illustrates another exemplary user interaction with an interface for a touch screen offset pointer according to some embodiments of the disclosure.

FIG. 3C illustrates another exemplary user interaction with an interface for a touch screen offset pointer according to some embodiments of the disclosure.

FIG. 8 illustrates a block diagram of an exemplary device according to some embodiments of the disclosure.

FIG. 9 illustrates a block diagram of an exemplary software configuration for a device according to some embodiments of the disclosure.

DETAILED DESCRIPTION

Figure 1:
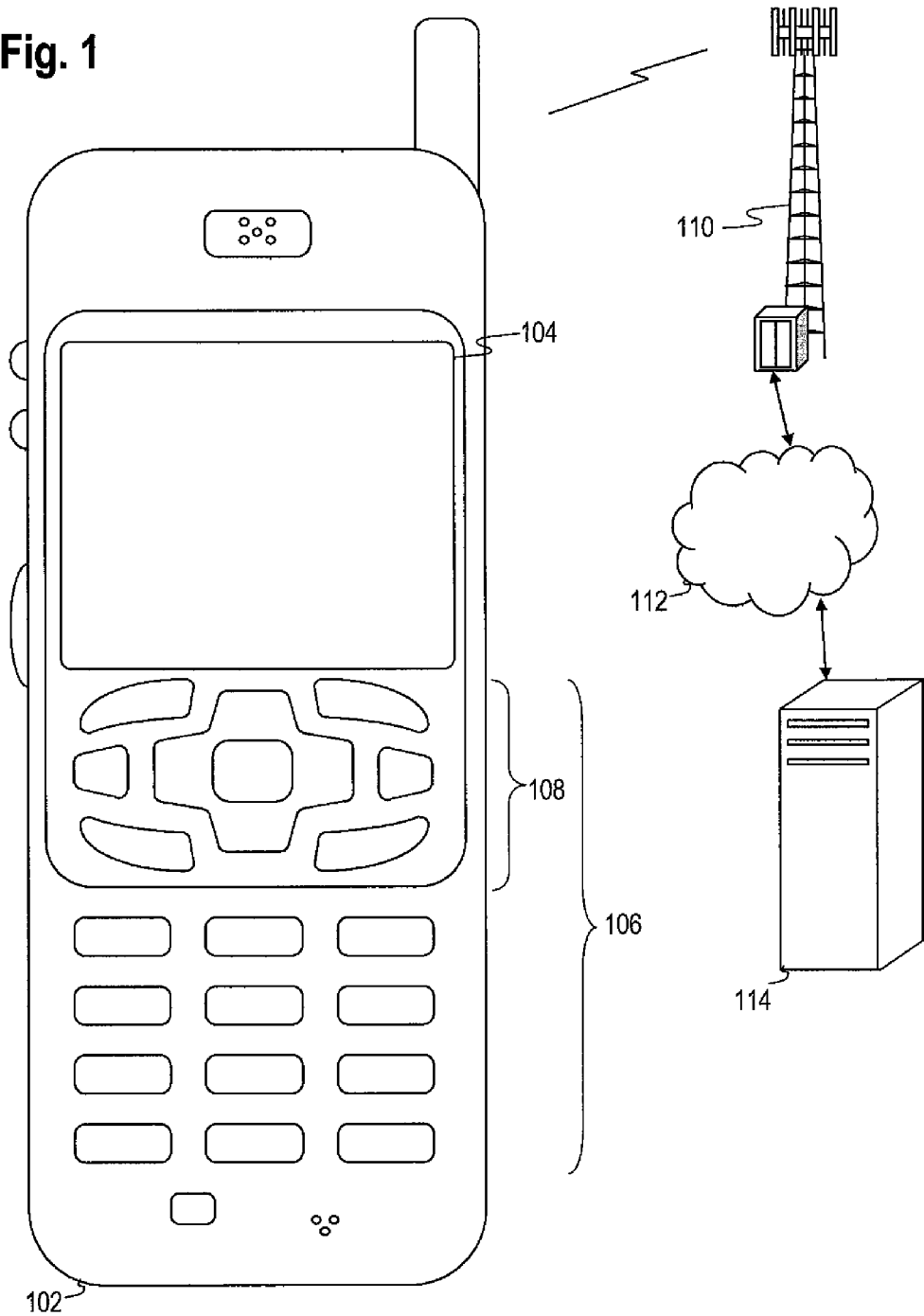
FIG. 1 illustrates an exemplary wireless handset and communications system according to some embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

When a touch screen displays a pointer at a location where a user's finger is touching the screen and the user cannot clearly see the pointer because their finger is in the way, the user may be dissatisfied with the functioning of the touch screen. Even if the user utilizes a stylus to touch the screen, the stylus may still obstruct the user's view of the displayed pointer that is used for highlighting and/or selecting content on the screen. Viewing the pointer clearly may become even more challenging for users of mobile devices that have smaller interface screens, such as mobile phones and personal digital assistants.

Accordingly, systems and methods that provide a touch screen offset pointer for a device are disclosed. The device includes a navigator engine that detects a first touch input at a first location on the touch screen and promotes the touch screen displaying a pointer that is offset from the first location. By displaying the pointer at an offset from the touched location, the device enables the user to see the pointer without the obstruction of the pointing device, such as the user's finger or other device. The navigator engine may change the offset amount and direction based on detecting a second touch input at a second location on the touch screen, such that the device displaces or moves the pointer based on a difference between the first location and the second location. For example, in one operational mode, when the user sweeps a finger broadly across the touch screen from left to right, the device may displace the pointer only half the distance to the right traveled by the finger, thereby giving the user a finer degree of granularity in moving the pointer. This partial displacement results in adjusting the offset to reflect the new relationship between the location touched by the finger and the location of the pointer.

While an offset for the pointer may enable the user to view the pointer without obstruction to highlight and/or select content towards the middle of the touch screen, the user may have difficulty in highlighting or selecting content that is near the edge of the display. For example, if the offset displays the pointer one-eighth of an inch above the touched location, the user may have difficulty highlighting or selecting content that is located within one-eighth of an inch of the bottom of the display. The display may address such an offset challenge by providing a border without selectable content at an edge of the display, where the offset is less than the width of the border. For example, when the border that occupies the bottom one-quarter of an inch of the touch screen is touched, the offset of one-eighth of an inch results in the pointer being displayed in the bottom one-eighth of an inch of the touch screen that includes selectable content.

The navigator engine also may address the offset challenge by modifying the offset based on touch inputs of the touch screen. For example, if the offset results in displaying the pointer one-eighth of an inch above the touched location, and the bottom one-eighth of an inch of the touch screen is touched, the navigator engine modifies the offset to display the pointer one-sixteenth of an inch above the touched location, providing a finer degree of granularity while still enabling an unobstructed view of the pointer. In another example, if the navigator engine detects that most of the selectable content near the bottom of the screen is to the right of the touched location, the navigator engine may modify the offset to display the pointer one-eighth of an inch to the right of the touched location, thereby providing an unobstructed view of the pointer on the right side of the touched location.

FIG. 1 illustrates an exemplary wireless handset and communications system. FIG. 1 depicts a device 102, which is operable for implementing aspects of the present disclosure, but the present disclosure should not be limited to these implementations. Though illustrated as a mobile phone, the device 102 may take various forms including a mobile computer, a portable computer, a tablet computer, a laptop computer, or a desktop computer. In some embodiments of the present disclosure, the device 102 is not a general purpose computing device like a portable, tablet, laptop, or desktop computer, but rather is a special-purpose communications device with a reduced screen size, such as a mobile telecommunication device, a mobile handset, a personal digital assistant (PDA), a handheld gaming device, a handheld wireless mobile device, a pager, a digital camera, a media player, and a digital calculator. Many suitable devices combine some or all of these functions. The device 102 may support specialized activities such as gaming, inventory control, job control, and/or task management functions, and so on.

The device 102 includes a display 104 and may include a touch-sensitive surface or keys 106 for input by a user. The touch-sensitive surface or keys 106 may include a directional pad 108 that enables a user to make directional selections. A device user may use the directional pad 108 to change a view of the contents of the display 104. The device 102 may present options for the user to select, controls for the user to actuate, and/or cursors or other indicators for the user to direct. The device 102 may further accept data entry from the user, including numbers to dial or various parameter values for configuring the operation of the device. The device 102 may further execute one or more software or firmware applications in response to user commands. These applications may configure the device 102 to perform various customized functions in response to user interaction. Additionally, the device 102 may be programmed and/or configured over-the-air, for example from a base transceiver station, a wireless access point, or a peer device 102.

The device 102 may execute a web browser application which enables the display 104 to show a web page. The web page may be obtained via wireless communications with a base transceiver station 110, a wireless network access node, a peer device 102 or any other wireless communication network or system. The base transceiver station 110 (or wireless network access node) is coupled to a wired network 112, such as the Internet. Via the wireless link and the wired network 112, the device 102 has access to information on various servers, such as a server 114. The server 114 may provide content that may be shown on the display 104. Alternatively, the device 102 may access the base transceiver station 110 through a peer device 102 acting as an intermediary, in a relay type or hop type of connection.

Figure 2A:
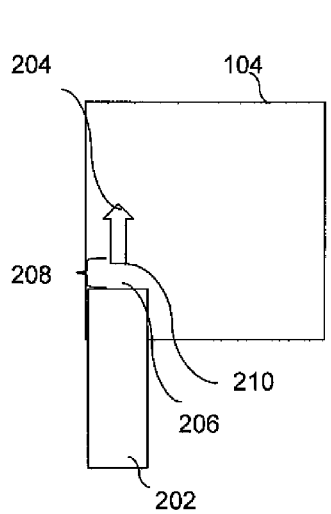
FIG. 2A illustrates an exemplary user interaction with an interface for a touch screen offset pointer according to some embodiments of the disclosure.
Figure 2B:
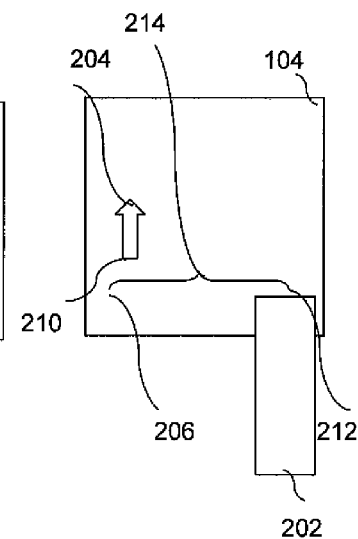
FIG. 2B illustrates another exemplary user interaction with an interface for a touch screen offset pointer according to some embodiments of the disclosure.
Figure 2C:
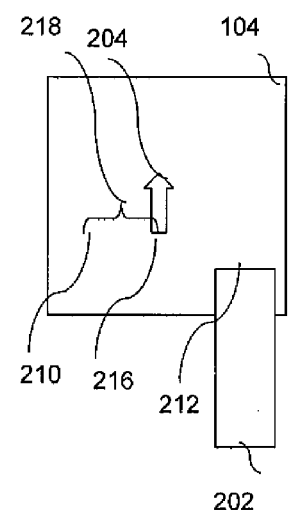
FIG. 2C illustrates another exemplary user interaction with an interface for a touch screen offset pointer according to some embodiments of the disclosure.

FIGS. 2A-C illustrate exemplary user interactions with an interface for a touch screen offset pointer according to some embodiments of the disclosure. The display 104 includes a space reserved for representing data or content on an interface screen. The display 104 may display a variable amount of information, such as selectable content items. Each selectable content item may be associated with an action to take when a device user uses the touch screen to select the associated selectable content item. The display 104 has the capability to detect the location of touches on the surface of the display 104. This capability allows the display 104 to be used as an input device, replacing the keyboard and/or the mouse as the primary input device for interacting with the display's 104 selectable content.

FIG. 2A depicts the display 104, a finger 202, such as of a user, a pointer 204, a first touch location 206, an offset 208, and a first pointer location 210. Although described as a device user's finger, the finger 202 that touches the surface of the display 104 may also be a pencil, a pen, a stylus, or any other item used for selecting or highlighting content items via the display 104. The pointer 204 is depicted as an arrow, but may be any icon, symbol, indicator, or depiction used to overlay, highlight, and/or select content items in the display 104.

In response to the finger 202 touching the display 104 at the first touch location 206, the display 104 displays the pointer 204 at the first pointer location 210, which is located at the offset 208 from the first touch location 206. By displaying the pointer 204 at the offset 208 from the first touch location 206, the display 104 enables the user to see beyond the finger 202 to view the content items in the display 104.

FIG. 2B depicts movement of the finger 202 from the first touch location 206 to a second touch location 212, which is located at a difference 214 from the first touch location 206. The display 104 continues to display the pointer 204 at the first pointer location 210 until the display 104 displaces the pointer 204 based on the difference 214.

FIG. 2C depicts the display 104 responding to the finger 202 moving to the second touch location 212 by displaying the pointer 204 at a second pointer location 216, which is located at a pointer displacement 218 from the first pointer location 210. In this example, the pointer displacement 218 is only half of the difference 214 between the first touch location 206 and the second touch location 212. Providing the pointer displacement 218 that is less than the difference 214 between the touch locations 206 and 212 gives the user a finer degree of granularity in moving the pointer 204. The displacement 218 may be referred to a relative displacement. The ratio between the pointer displacement 218 and the difference 214 may be pre-configured and/or configured by the user. For example, if the user has configured the ratio between the pointer displacement 218 and the difference 214 to be one-to-one, the pointer displacement 218 matches the difference 214 in both direction and in magnitude. In this example, the pointer displacement 218 may be referred to as an absolute displacement.

FIGS. 3A-C illustrate other exemplary user interactions with an interface for a touch screen offset pointer according to some embodiments of the disclosure that include a border. Although FIGS. 3A-C depict a border that circumscribes the portion of the display 104 that displays selectable content, the border may be on fewer edges of the display 104, such as a bottom edge.

FIG. 3A depicts the display 104, the finger 202, the pointer 204, the first touch location 206, the offset 208, the first pointer location 210, a border 302, and a width 304 of the border 302. The border 302 is an area of the display 104 that excludes content items that may be highlighted, overlaid, or selected by the device user. In response to the touch input at the first touch location 206, the display 104 displays the pointer 204 at the first pointer location 210, which is located at the offset 208 from the first touch location 206.

FIG. 3B depicts movement of the finger 202 to a third touch location 306, which is located in the border 302. The display 104 continues to display the pointer 204 at the first pointer location 210 until the display 104 displaces the pointer 204 based on the third touch location 306.

FIG. 3C depicts the display 104 responding to the touch input at the third touch location 306 by displaying the pointer 204 at a third pointer location 308, which is located at the offset 208 from the third pointer location 306. Because the offset 208 is smaller than the width 304 of the border 302, the device user may use the pointer 204 to highlight, overlay, or select any content item that is circumscribed by the border 302, even items that are displayed at the edges of the display 104 that are circumscribed by the border 302. The pointer 204 may be displayed at the third pointer location 308, which is near the bottom edge of the display 104, thereby overcoming the challenges in highlighting or selecting content that is near the edge of the display 104. Because the offset 208 does not change in this example, the displacement of the pointer 204 is an absolute displacement. A speed of displacing the pointer 204 may be based on a time lag or a ratio applied to a time difference between the first touch input and the second touch input. For example, one-eighth of a second after the navigator engine detects the touch input at the third touch location 306, the display 104 displays the pointer 204 at the third pointer location 308. Time lags and ratios are discussed in further detail below in reference to box 508.

Figure 4A:
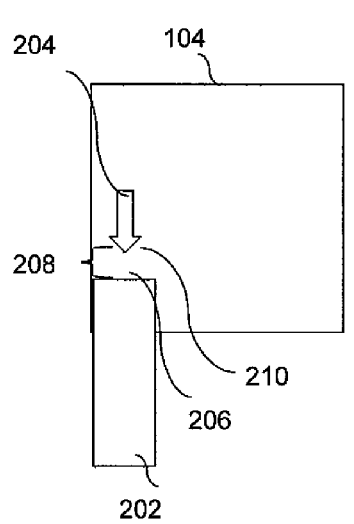
FIG. 4A illustrates another exemplary user interaction with an interface for a touch screen offset pointer according to some embodiments of the disclosure.
Figure 4B:
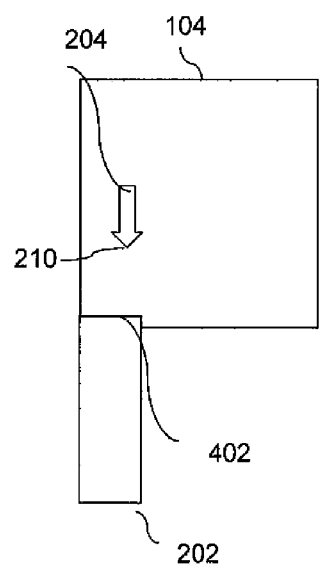
FIG. 4B illustrates another exemplary user interaction with an interface for a touch screen offset pointer according to some embodiments of the disclosure.
Figure 4C:
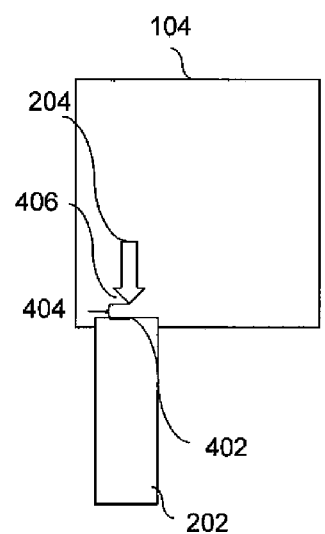
FIG. 4C illustrates another exemplary user interaction with an interface for a touch screen offset pointer according to some embodiments of the disclosure.

FIGS. 4A-C illustrate other exemplary user interactions with an interface for a touch screen offset pointer according to some embodiments of the disclosure that may adjust the offset. FIG. 4A depicts the display 104, the finger 202, the pointer 204, the first touch location 206, the offset 208, and the first pointer location 210. In response to the touch input at the display 104 at the first touch location 206, the display 104 displays the pointer 204 at the first pointer location 210, which is located at the offset 208 from the first touch location 206.

FIG. 4B depicts the movement of the finger 202 toward the lower part of the display 104 to a fourth touch location 402. Responsive to movement of the user's finger 202 to the fourth touch location 402, the display 104 updates the pointer 204 to a fourth pointer location 406, see FIG. 4C. The fourth pointer location 406 is at a second offset 404 from the fourth touch location 402. The second offset 404 may differ from the first offset 208 based on the various touch locations. In this example, the displacement of the pointer 204 differs from the movement of the finger 202 to enable the selection of content near the bottom of the display 104. Such a displacement may be referred to as a relative displacement. If the second offset 404 is the same as the first offset 208 based on the various touch locations, such a displacement may be referred to as an absolute displacement.

Figure 5:
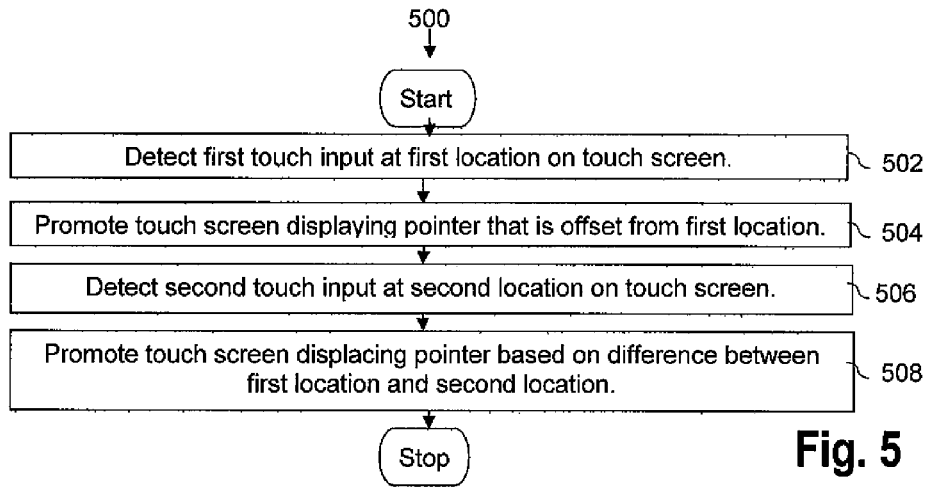
FIG. 5 illustrates an exemplary method for a touch screen offset pointer according to some embodiments of the disclosure.

FIG. 5 illustrates an exemplary method 500 for providing a touch screen offset pointer interface according to an embodiment of the present disclosure. Execution of the method 500 comprises detecting a first touch input at a first location, displaying a pointer that is offset for the first location, detecting a second touch input at a second location, and displaying the pointer based on the difference between the first location and the second location.

In box 502, a first touch input is detected at a first location on the touch screen. For example, a navigator engine detects the touch input at the first touch location 206 on the left side of the display 104. The navigator engine may be a software component that detects touch input at locations on the display 104 and promotes the display 104 displaying the pointer 204 at the locations on the display 104.

In box 504, a pointer is displayed offset from the first touch location 206. For example, the navigator engine promotes the display 104 displaying the pointer 204 at the first pointer location 210 on the left side of the display 104, which is at the offset 208 from the first touch location 206.

In box 506, a second touch input is detected at a second location on the touch screen. For example, the navigator engine detects the touch input at the second touch location 212, which may indicate that the user moved the finger 202 from the left side of the display 104 to the right side of the display 104.

In box 508, the pointer is displayed based on a difference between the first location and the second location. For example, the navigator engine promotes the display 104 displacing the pointer 204 based on the difference 214 between the first touch location 206 and the second touch location 212, such that the display 104 displays the pointer 204 at the second pointer location 216 in the middle of the display 104. The device user may quickly and easily learn to locate the finger 202 on the display 104 at the offset 208 from content items desired for highlighting, overlaying, and/or selecting.

A direction for displacing the pointer 204 may be based on a direction from the first touch location 206 to the second touch location 212. For example, because the direction from the first touch location 206 to the second touch location 212 is from the left side of the display 104 to the right side of the display 104, the pointer displacement 218 is from the left side of the display 104 to the right side of the display 104.

A speed of displacing the pointer 204 may be based on a time lag or a ratio applied to a time difference between the first touch input and the second touch input. For example, one-eighth of a second after the navigator engine detects the touch input at the second touch location 212, the display 104 displays the pointer 204 at the second pointer location 216. In another example, in response to the navigator engine detecting the touch input at the second touch location 212 one-quarter of a second after detecting the touch input at the first touch location 206, the display 104 takes three-quarters of a second to display the pointer 204 at the second pointer location 216 based on a one-to-three ratio. Displacing the pointer 204 based on a time lag or a ratio provides the user time to review the displacement of the pointer 204 while the displacement is occurring, which enables the user to compensate for any touch input of the display 104 that will result in the pointer 204 moving too much or not enough in the desired direction. The speed may be configurable by a user. For example, the user may modify the time lag from one-eighth of a second to one-sixteenth of a second, or more or less, or the user may modify a one-to-three speed ratio to a one-to-two speed ratio.

Displacing the pointer 204 a distance may be based on a ratio and a difference between locations. For example, the navigator engine may promote the display 104 displaying the pointer 204 based on the pointer displacement 218 of two inches in response to the difference 214 of five inches between the first touch location 206 and the second touch location 212. By displacing the pointer 204 based on a two-to-five distance ratio, the navigator engine enables a finer degree of granularity in controlling the pointer 204. The ratio may be configurable by a user. For example, the user may modify the two-to-five distance ratio to a three-to-five distance ratio. If the distance ratio is one-to-one, the offset 208 between the second touch location 212 and the second pointer location 216 remains the same. Otherwise, the offset 208 changes to accommodate the divergence between the difference 214 and the pointer displacement 218, thereby resulting in a relative displacement. For example, if the offset 208 resulted in displaying the pointer 204 one-quarter of an inch above the first touch location 206, the distance between the second touch location 212 and the first touch location 206 is four inches to the right side of the display 104, and the pointer displacement 218 is two inches to the right side of the display 104, then a revised offset would result in displaying the pointer 204 one-quarter inch above and two inches to the left of the second touch location 212.

Because the ratio between the pointer displacement 218 and the difference 214 may be pre-configured and/or configured by the user, the pointer displacement 218 may be relative displacement or absolute displacement. If the user has configured the pointer displacement 218 for relative displacement, the navigator engine converts each movement of the user's finger 202 into its own separate relative displacement 218. If the user has configured the pointer displacement 218 for absolute displacement, the navigator engine converts each movement of the user's finger 202 into a corresponding absolute pointer displacement 218 for the pointer 204.

Figure 6:
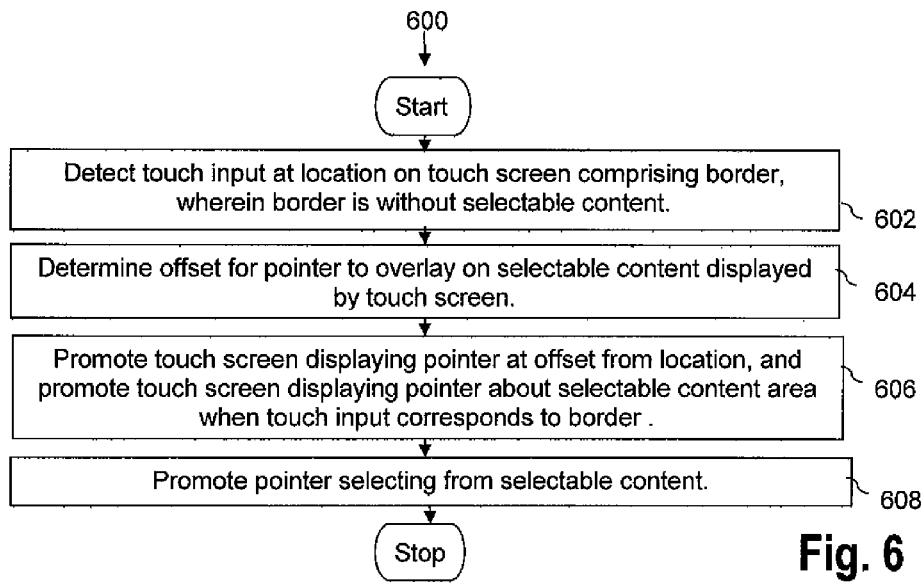
FIG. 6 illustrates another exemplary method for a touch screen offset pointer according to some embodiments of the disclosure.

FIG. 6 illustrates another exemplary method 600 for providing a touch screen offset pointer interface according to an embodiment of the present disclosure. Execution of the method 600 comprises detecting a touch input at a location on a display that includes a border, determining an offset for a pointer, and displaying the pointer at the offset from the location.

In box 602, a touch input is detected at a location on the touch screen that includes a selectable content area and a border, wherein the border is without selectable content. For example, the navigator engine detects the touch input at the first touch location 206 on the display 104, which is circumscribed by the border 302. The width 304 of the border 302 may be configurable by a user. For example, the user may modify the width 304 from one-quarter of an inch to one-eighth of an inch.

In box 604, an offset is determined for a pointer to overlay on content displayed by the touch screen. For example, the navigator engine determines the offset 208 as one-eighth of an inch for the pointer 204 to overlay on content circumscribed by the border 302 of the display 104. The navigator engine determines the offset 208 to enable the pointer 204 to highlight or select any of the content circumscribed by the border 302. The offset may be configurable by the user. For example, the user may modify the offset 208 from one-eighth of an inch to one-sixteenth of an inch.

In box 606, the pointer is displayed at the offset from the location, and the pointer is displayed about the selectable content area when the touch input corresponds to the border. For example, the navigator engine promotes the display 104 displaying the pointer 204 at the offset 208 from the third touch location 306, which is in the selectable content area of the display 104 and which corresponds to the border 302. When the offset 208 is less than the width 304 of the border 302, the pointer 204 may highlight or select any of the content circumscribed by the border 302. Thus, as the user's finger 202 moves to the lowest edge of the display 104, the pointer 204 moves to the lowest portion of the displayed content, which in FIG. 3C is the third pointer location 308 that is just above the bottom portion of the border 302.

In box 608, the pointer selects from the selectable content. For example, the navigator engine promotes the pointer 204 selecting from the selectable content circumscribed by the border 302.

Figure 7:
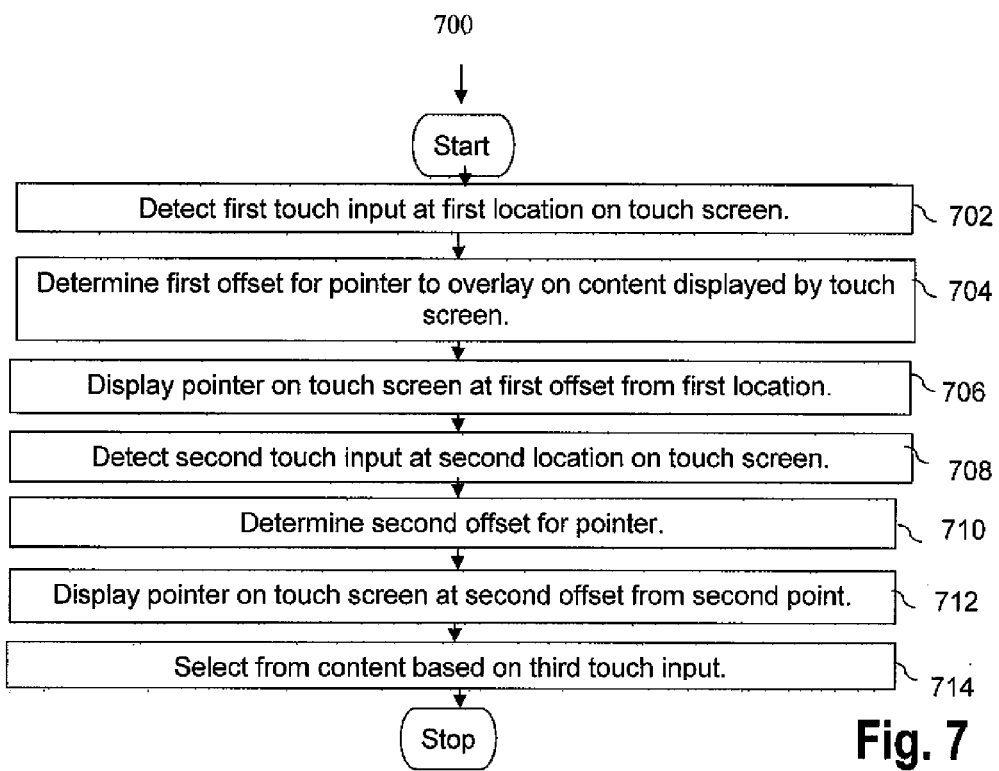
FIG. 7 illustrates yet another exemplary method for a touch screen offset pointer according to some embodiments of the disclosure.

FIG. 7 illustrates an exemplary method 700 for providing a touch screen offset pointer interface according to an embodiment of the present disclosure. Execution of the method 700 comprises detecting a first touch input at a first location, determining a first offset, displaying a pointer at the first offset from the first location, detecting a next touch input at a next location, determining a second offset, and displaying the pointer at the second offset from the subsequent location.

In box 702, a first touch input is detected at a first location on a touch screen. For example, the navigator engine detects the touch input at the first touch location 206 on the left side of the display 104.

In box 704, a first offset is determined for a pointer to overlay on content displayed by the touch screen. For example, the navigator engine determines the offset 208 for the pointer 204 to overlay on content displayed by the display 104. The first offset may be configurable by a user. For example, the user modifies the offset 208 from one-quarter of an inch to one-eighth of an inch.

In box 706, the pointer is displayed on the touch screen at the first offset from the first location. For example, the navigator engine displays the pointer 204 on the left side of the display 104 at the offset 208 from the first touch location 206, which is the first pointer location 210 that is one-eighth of an inch above the first touch location 206.

In box 708, a next touch input is detected at a next location on the touch screen. For example, the navigator engine detects movement from the touch input at the first location 206 to the touch input at the fourth touch location 402 at the bottom of the display 104.

In box 710, a second offset is determined for the pointer. For example, the navigator engine determines the second offset 404 for the pointer 204 to be one-sixteenth of an inch. The first offset may equal the second offset. For example, if neither the first touch location 206 nor the fourth touch location 402 are close to the edges of the content displayed by the display 104, both the offset 208 and the second offset 404 may be equal to one-eighth of an inch because a relatively large offset still may be suitable for highlighting or selecting content that is situated towards the middle of the display 104.

The second offset may be based on a proximity of the next location to an edge of the touch screen. For example, if the fourth touch location 402 is within one eighth of an inch of the bottom of the display 104, the navigator engine may determine the second offset 402 as one-sixteenth of an inch to enable the pointer 204 to be located above the fourth touch location 402 and still highlight or select content at the bottom of the display 104.

The second offset may be based on a time difference between the first touch input and the next touch input. For example, the navigator engine may measure only one-tenth of a second between the time the navigator engine detects the touch input at the first touch location 206 and the time the navigator engine detects the touch input at the fourth touch location 402. This time measurement for the user quickly moving the finger 202 may indicate that the user is more interested in simply moving the pointer 204 than in selectively highlighting content in the area of the fourth touch location 402. In this situation, the navigator engine may determine the second offset 404 to be the same magnitude and direction as the offset 208 because of the indication that moving the pointer 204 may be more important than highlighting or selecting specific content.

The second offset may be based on a direction from the first touch input to the next touch input. For example, if the offset 208 results in displaying the pointer 204 above the first touch location 206 and the navigator engine detects the next touch location at the very top of the display 104, the navigator engine may determine the second offset 404 as an offset to the right of the next touch location to enable the user to continue viewing the pointer 204.

The second offset may be based on a location of selectable content. For example, if the fourth touch location 402 is within one-sixteenth of an inch of specific content at the bottom of the display 104, and the offset 208 is one-eighth of an inch, the navigator engine may determine the second offset 404 to be one-sixteenth of an inch to facilitate the user placing the finger 202 on the display 104 to highlight or select the specific content.

In box 712, the pointer is displayed on the touch screen at the second offset from the next location. For example, the navigator engine displays the pointer 204 on the display at the fourth pointer location 406, which is at the second offset 404 from the fourth touch location 402.

In box 714, the content is selected based on a third touch input. For example, the navigator engine selects from the content based on detecting the touch input at the fourth touch location 402 again, which may indicate that the user is tapping the finger 202 to select the content at the fourth touch location 402.

FIG. 8 illustrates an exemplary block diagram of the device 102. While a variety of known components of devices 102 are depicted, in an embodiment a subset of the listed components and/or additional components not listed may be included in the device 102. The device 102 includes a digital signal processor (DSP) 802 and a memory 804. As shown, the device 102 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, an infrared port 824, a vibrator 826, a keypad 828, a touch screen liquid crystal display (LCD) with a touch sensitive surface 830, a touch screen/LCD controller 832, a charge-coupled device (CCD) camera 834, a camera controller 836, and a global positioning system (GPS) sensor 838. In an embodiment, the device 102 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the device 102 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the device 102 to send and receive information from a cellular network or some other available wireless communications network or from a peer device 102. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 408, portions of the antenna and front end 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset port 816 and outputs to the earpiece speaker 814 and the headset 816. To that end, the analog baseband processing unit 810 may have ports for connecting to the built-in microphone 812 and the earpiece speaker 814 that enable the device 102 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB port 822 and the infrared port 824. The USB port 822 may enable the device 102 to function as a peripheral device to exchange information with a personal computer or other computer system. The infrared port 824 and other optional ports such as a Bluetooth interface or an IEEE 802.11 compliant wireless interface may enable the device 102 to communicate wirelessly with other nearby devices and/or wireless base stations.

The input/output interface 818 may further connect the DSP 802 to the vibrator 826 that, when triggered, causes the device 102 to vibrate. The vibrator 826 may serve as a mechanism for silently alerting the user to any of various events such as an incoming call, a new text message, and an appointment reminder.

The keypad 828 couples to the DSP 802 via the interface 818 to provide one mechanism for the user to make selections, enter information, and otherwise provide input to the device 102. Another input mechanism may be the touch screen LCD 830, which may also display text and/or graphics to the user. The touch screen LCD controller 832 couples the DSP 802 to the touch screen LCD 830.

The CCD camera 834 enables the device 102 to take digital pictures. The DSP 802 communicates with the CCD camera 834 via the camera controller 836. The GPS sensor 838 is coupled to the DSP 802 to decode global positioning system signals, thereby enabling the device 102 to determine its position. In another embodiment, a camera operating according to a technology other than Charge Coupled Device cameras may be employed. Various other peripherals may also be included to provide additional functions, e.g., radio and television reception.

FIG. 9 illustrates an exemplary software environment 902 that may be implemented by the DSP 802. The DSP 802 executes operating system drivers 904 that provide a platform from which the rest of the software operates. The operating system drivers 904 provide drivers for the device hardware with standardized interfaces that are accessible to application software. The operating system drivers 904 include application management services ("AMS") 906 that transfer control between applications running on the device 102. Also shown in FIG. 9 are a web browser application 908, a media player application 910, JAVA applets 912, and a navigator engine 914. The web browser application 908 configures the device 102 to operate as a web browser, allowing a user to enter information into forms and select links to retrieve and view web pages. The media player application 910 configures the device 102 to retrieve and play audio or audiovisual media. The JAVA applets 912 configure the device 102 to provide games, utilities, and other functionality. The navigator engine 914 enables the device 102 to detect touch inputs at locations on the display 104 and to display the pointer 204 at offsets from those locations.

Figure 10:
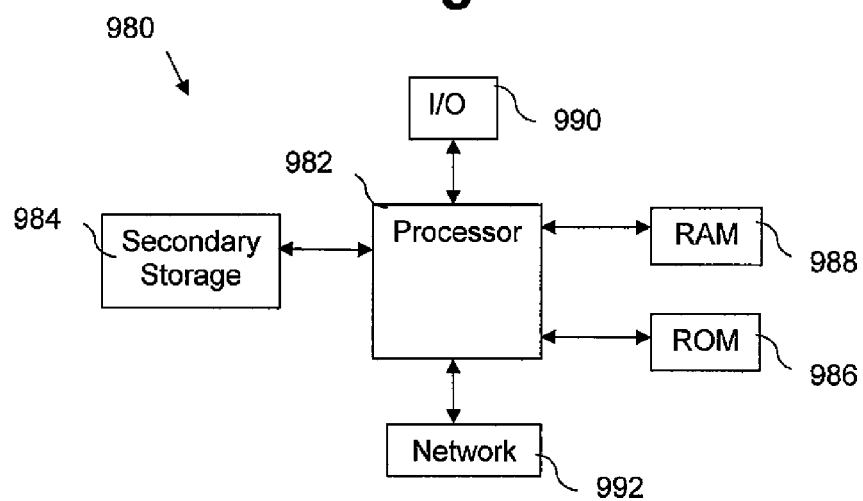
FIG. 10 illustrates an exemplary general purpose computer system suitable for implementing the several embodiments of the disclosure.

In some embodiments, the system described above may be implemented on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, such as the display 104, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O devices 990 may include printers, video monitors, liquid crystal displays (LCDs), touch screen displays, such as the display 104, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 992 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A device with a touch screen offset pointer, comprising:
a processor;
a touch screen; and
a navigator engine, when executed by the processor,
to detect a first touch input by a finger at a first touch input location on the touch screen,
to determine an offset for a pointer to overlay on content displayed on the touch screen,
to modify the offset to a lesser offset when the first touch input location is less than the offset from the edge of the touch screen,
to modify the offset to a different direction when the navigator engine detects that a majority of the selectable content is in the different direction,
to display the pointer on the touch screen at a first pointer location located at the modified offset from the first touch input location,
to detect a continuous movement of the same finger across the touch screen from the first touch input at the first touch input location to a second touch input at a second touch input location,
to determine a second pointer location at a pointer displacement from the first pointer location, wherein the pointer displacement is less than the distance of the continuous movement, and wherein the pointer displacement varies based on a speed of the continuous movement from the first touch input to the second touch input, and
to display the pointer on the touch screen at the second pointer location.

2. The device of claim 1, wherein the navigator engine is configurable to select from the content based on a third touch input.

3. The device of claim 1, wherein the distance between the first pointer location and the second pointer location is based on a proximity of the second touch input location to an edge of the touch screen.

4. The device of claim 1, wherein the second pointer location is based on a time difference between the first touch input and the second touch input.

5. The device of claim 1, wherein the second pointer location is based on a direction from the first touch input to the second touch input.

6. The device of claim 1, wherein the second pointer location is based on a location of selectable content.

7. The device of claim 1, wherein the offset is configurable.

8. The device of claim 1, wherein the device has a reduced screen size and is one of a mobile telecommunication device, a mobile handset, a personal digital assistant, a handheld gaming device, a handheld wireless mobile device, a pager, a digital camera, a media player, and a digital calculator.

9. The device of claim 1, wherein the device is one of a mobile computer, a portable computer, a tablet computer, a laptop computer, and a desktop computer.

10. The device of claim 1, wherein the pointer displacement is based on a time difference between the first touch input and the second touch input.

11. The device of claim 1, further comprising a border on more than one edge of the touch screen, wherein the border is without selectable content, and wherein the border is capable of detecting a touch input.

12. A device with a touch screen offset pointer, comprising:
detecting a first touch input by a first finger at a first touch input location on the touch screen;
determining an offset for a pointer to overlay on content displayed on the touch screen;
modifying the offset to a lesser offset when the first touch input location is less than the offset from the edge of the touch screen;
modifying the offset to a different direction when the navigator engine detects that a majority of the selectable content is in the different direction;
detecting a continuous movement by the first finger across the touch screen from the first touch input at the first touch input location to a second touch input at a second touch input location;
displaying the pointer at a first pointer location that is at the modified offset from the first touch input location; and
displacing the pointer on the touch screen to a second pointer position located at a pointer displacement from the first pointer location, wherein the pointer displacement is less than the distance of the continuous movement, and wherein a speed of displacing the pointer is based on a ratio applied to a time difference between the first touch input by the first finger and the second touch input by the first finger, and wherein the first finger is the only finger on the touch screen.

13. The computer implemented method of claim 12, wherein a direction for displacing the pointer is based on a direction to the second touch input location from the first touch input location.

14. The computer implemented method of claim 12, wherein the speed is configurable.

15. The computer implemented method of claim 12, wherein the pointer displacement is based on a time difference between the first touch input and the second touch input.

16. A device with a touch screen offset pointer, comprising:
a processor;
a touch screen comprising a selectable content area and a border around the entire perimeter of the touch screen, wherein the border comprises a top border region, a bottom border region, a left border region, and a right border region, wherein the border is without selectable content, and wherein the border is capable of detecting a touch input; and
a navigator engine, when executed by the processor,
to detect a first touch input by a finger at a location on the touch screen within the selectable content area,
to determine an offset for a pointer to overlay on selectable content displayed by the touch screen,
to modify the offset to a lesser offset when the first touch input location is less than the offset from the edge of the touch screen,
to modify the offset to a different direction when the navigator engine detects that a majority of the selectable content is in the different direction,
to display the pointer on the touch screen at a first pointer location located at the modified offset from the first touch input location within the selectable content area,
to detect a continuous movement of the same finger across the touch screen from the first touch input at the first touch input location to a second touch input at a second touch input location within one of the top border region, the left border region, or the right border region, and
to determine a second pointer location at a pointer displacement from the first pointer location, wherein the pointer displacement is less than the distance of the continuous movement such that the pointer does not enter the one of the top border, the left border region, or the right border region, and wherein a speed of displacing the pointer is based on a ratio applied to a time difference between the first touch input by the same finger and the second touch input by the same finger.

17. The device of claim 16, wherein the navigator engine further promotes the pointer selecting from the selectable content displayed by the touch screen.

18. The device of claim 16, wherein the width of the border is configurable.

19. The device of claim 16, wherein the offset is configurable.

* * * * *